Oct. 14, 1947.  G. M. MAST ET AL  2,429,164
ADJUSTABLE LENS MOUNT FOR PROJECTION APPARATUS
Filed May 18, 1944  2 Sheets-Sheet 1

Inventors
Gifford M. Mast;
Elmer R. Sharp;

By Milans&Milans

Attorneys

Oct. 14, 1947.   G. M. MAST ET AL   2,429,164
ADJUSTABLE LENS MOUNT FOR PROJECTION APPARATUS
Filed May 18, 1944       2 Sheets-Sheet 2
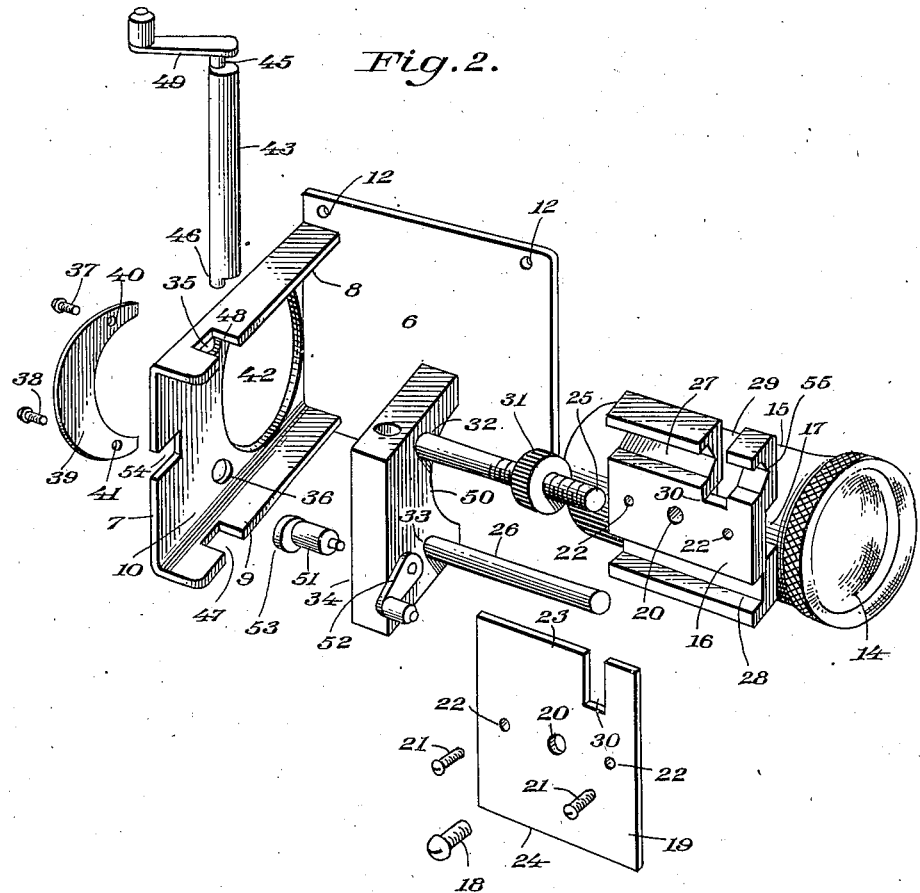
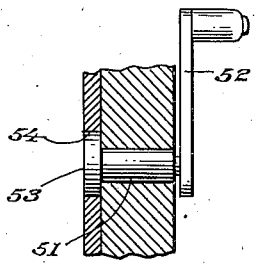
Inventors
Gifford M. Mast:
Elmer R. Sharp:
By Milans & Milans
Attorneys Patented Oct. 14, 1947

2,429,164

UNITED STATES PATENT OFFICE 2,429,164

ADJUSTABLE LENS MOUNT FOR PROJECTION APPARATUS

Gifford M. Mast and Elmer R. Sharp, Detroit, Mich., assignors to The Jam Handy Organization, Inc., Detroit, Mich., a corporation of Delaware Application May 18, 1944, Serial No. 536,144

2 Claims. (Cl. 88—24)

1

This invention relates to improvements in adjustable projection apparatus, and has as its primary object the provision of a simple and efficient means for moving the lens of the projector longitudinally for focusing, and vertically and horizontally, for positioning a projected image on a screen surface.

Heretofore it has been a common practice to secure the location of the projected image or picture on the screen by resort to such expedients as tilting the base of the projector or utilizing wedges or the like, introduced beneath the feet of the projector.

A practical embodiment of the present invention obviates such expedients by providing means capable of securing the three adjustments referred to, namely, the longitudinal focusing adjustment of the lens and the vertical and horizontal adjustments thereof to position the image on the screen, without disarranging the axis of the lens relative to the film, in other words maintaining said axis perpendicular to the film in any or all phases of adjustment of the lens.

In gunnery training, where the apparatus employed consists of two projectors, the images from which must be accurately superimposed, the adjusting instrumentalities referred to are especially advantageous. The same also finds a field of usefulness in connection with projecting stereoscopic pictures from twin projectors; in connection with single projection equipment to position the projected image in the desired place on the screen; and in instances where it is only necessary or desirable to have merely a vertical adjustment instead of both vertical and horizontal adjustments, to locate the picture on the screen without resort to the use of a tilting base for the projector, or wedging thereof, such as previously referred to.

The preferred embodiment of the invention possesses the characteristics of the three adjustments mentioned while maintaining the perpendicular relationship of the projector with the screen, ease and facility of adjustment attained by great precision, although manipulated by an inexperienced operator, and a type of construction which will be economical in manufacture and suited to large quantity production.

The above-recited underlying objects, and desirable construction capable of carrying said objects into practical effect, further embrace novel details of parts and combinations all of which will appear and be pointed to in the specific description hereinafter contained when read in connection with the accompanying drawing

2 forming a part hereof and wherein a practical, and the preferred embodiment of the invention, is illustrated.

In the drawings:

Figure 2 is what may be termed an exploded view of the said adjustable projection apparatus to show the elements of the construction and portray the order of associating and connecting the parts in combination.

Figure 4 is a similar cross-section on the line 4—4 of Figure 1 showing the means for attaining the vertical adjustment.

Figure 1:
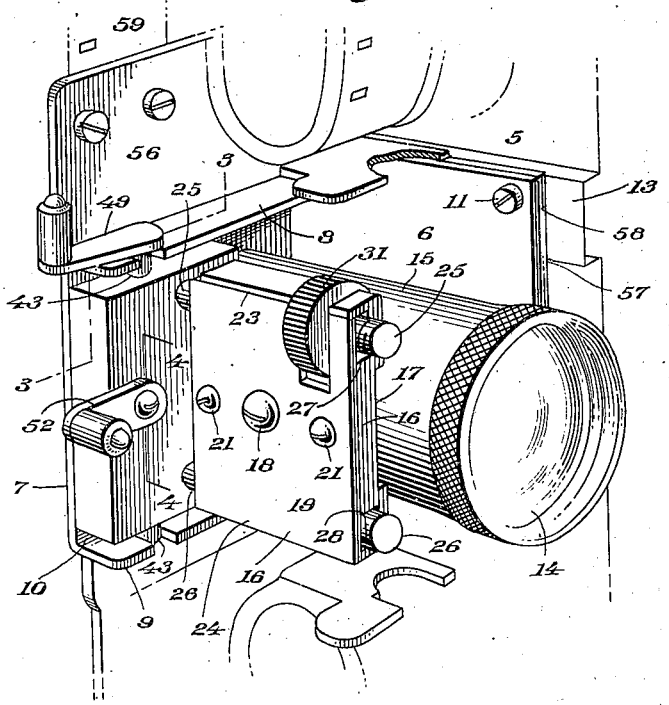
Figure 1 is a perspective view of fragmentary portions of a projecting apparatus (standard 16 mm. projector) showing the relationship and maintaining of the adjustable projection apparatus in connection therewith.
Figure 3:
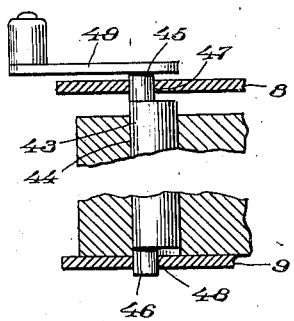
Figure 3 is a cross-section on the line 3—3 of Figure 1, showing the means for attaining the horizontal adjustment.

Referring more specifically to the drawings, wherein like reference characters designate the same parts in the several views 5 designates, in a fragmentary manner, the head of a motion picture projecting apparatus (as standard Ampro projector) to which the present improvements are applied. The primary supporting means for the lens adjustable device comprises a base member consisting of two angularly disposed, preferably integrally connected, vertical plates 6 and 7, disposed at right angles to each other, the plate 7 having elongated top and bottom flanges 8 and 9 projecting forwardly therefrom to constitute a way or channel 10 for a purpose to be later referred to. The abutting edges or ends of the flanges 8 and 9 are rigidly secured to the companion plate 6, as by welding, brazing or otherwise, said edges to the face of the plate 6. The supporting device, 6—7, is securely fastened and supported in place on the machine by screws 11 passing through suitable apertures 12, in the plate 6, and into the adjacent wall portion 13 of the head 5 of the machine.

14 is the lens, and 15 is the lens tube which, in keeping with the invention, shall be adjustable longitudinally in focusing, and also laterally in vertical and horizontal directions to obtain corresponding adjustment of the lens with reference to the screen on which the picture or other matter is to be projected.

The lens 14 is securely fastened in relation to an adjustable vertically arranged block 16 having a longitudinal U-shaped groove 17 along its inner face, axially aligned with the lens tube, and having relatively sharp upper and lower edges so that the lens tube may be seated and bound in said edged and grooved portion of the block 16 by a binding screw 18, passed through a cover or front plate 19, thence through a corresponding aperture 20, in the block, and having threaded engagement with the wall of the lens tube 15. The front plate 19, referred to, is of sheet spring metal secured to the block 16 by a pair of screws 21, passing therethrough, and into the suitable threaded apertures 22 in the block 16. When the central portion of this plate 19 is screwed in place on the block 16, the upper portion 23 and the lower portion 24 thereof are adapted to frictionally engage the surface of an adjusting screw or threaded rod 25 and companion cylindrical guide rod 26 located in corresponding parallel grooved portions 27 and 28, in the outer face of the block 16. The top portion of the block and the plate 19 are provided with cut-away portions to constitute vertically disposed grooves 29 and 30 respectively, in registration, to accommodate a knurled or similar nut 31 introduced thereinto, and threaded upon the screw 25, the same being of a diameter to project outwardly beyond the adjacent surfaces of the block 16 and its cover 19, in position for easy manipulation. The end walls of the grooved portions 29—30 are adapted to contact the adjacent sides of the knurled nut so that the rotation of the nut will have the appropriate advancing or receding effect on the block 16 and associated parts to be shifted in corresponding directions to obtain the desired focusing of the device.

The inner ends of the adjusting screw rod 25 and guide rod 26 are sleeved through openings 32 and 33 respectively, of an adjustable slide block 34, and having loose or play fit in aligned openings 35 and 36, in the plate 7 of the fixed or base support, the extreme end portion of the screw and guide rods being engaged by securing screws 37 and 38, threaded into the ends thereof. An interposed bowed spring plate 39, through the ends of which said screws 37 and 38 pass, as at 40 and 41 and bearing upon the rear face of the plate 7 and screw heads creates a binding engagement and hold the adjusting screw rod 25 and guide rod 26, as well as a yieldable inner surface bearing of the block 34, on the said plate, allowing for substantial movement of the block 34 with reference to the plate 7 both longitudinally and vertically of said plate 7. Thus a secure attachment of the block 34 (and parts associated with the screw rod 25 and guide rod 26) in the channel or way 10, of the plate 7, is obtained; and adjustments thereof laterally and vertically in said channel or way 10 may be obtained through the medium of special adjustment devices, now to be defined.

It is to be understood that the vertical length of the block 34 is substantially less than the space between the upper and lower flanges 8 and 9 of the plate 7, to allow for vertical adjustment of the block in the way or channel 10 between the flanges, and the width thereof substantially less than the effective length of said channel to permit lateral adjustment of the block 34. It is further understood that an opening 42, in the plate 7, generally in line with the lens tube 15, is of sufficient diameter to permit these bodily adjustments of the lens and tube when, and if, the inner end of said tube 15 extends into or through said opening 42. The opening 42 permits light to reach the lens and clearing the lens itself when it must be close to the aperture.

Vertically through the block 34 is an eccentric or cam shaft 43 fitting the complemental apertured portion 44 through said block and having eccentric cam portions, or pintles 45 and 46 at its upper and lower ends offset from the axis of the shaft 43 and engaging in identical symmetrical slotted bearing portions 47 and 48 opening forwardly in the flanges 8 and 9 of the base plate or channel member 7. To the end of the pintle or cam 45 a crank 49 is fixedly attached and projected to be operated from above the flange 8.

By the arrangement thus defined it will be appreciated that a rotation of the crank 49 will cause the cam portions 45 and 46 to similarly rotate in their bearings in the flanges 8 and 9, causing the axially disaligned shaft 43 to turn and effect correspondingly pushing or pulling of the block 34 horizontally or longitudinally of the supporting plate 7, and parallel thereto, to correspondingly adjust the parts carried by the block 34 and obtain the desired positioning of the lens, and image projected therefrom, horizontally or transversely of the screen.

Of course, the block 34 is rounded at its inner edge, as indicated at 50, to accommodate the corresponding curved outer surface of the inner end of the lens tube 15, carried by and adjustable with the block 16.

To obtain a quite similar vertical adjustment of the block 34, and associated parts carried by the block, including the lens, said block is provided with a horizontal shaft 51 passed through and mounted to rotate in said block. The shaft has an operating crank 52, arranged to rotate at the front of the block, and an actuating cam disc 53 at its rear and rotatable in a laterally opening slotted bearing portion 54 at the adjacent end of the plate 7. This cam surface is cylindrical and has a close fit with the walls of the block so that the same cannot become displaced therein, and upon rotation thereof the block 34, through the medium of the axially disaligned shaft 51 passing therethrough, will be shifted in a vertical direction dependent upon the position of the cam 53, to adjust the block 34 and associated parts, inclusive of the lens, transversely or vertically of the plate 7 and parallel with the plate between the flanges 8 and 9 thereof. Thus, manipulation of the crank 52, or its equivalent, will obtain the vertical positioning of the lens and image projected therefrom with reference to the screen as may be desired or conditions require.

It will be appreciated that the arrangement of the vertical and lateral adjusting devices, both operating through the block 34, enables the utilization of the shaft 43 as a guide for the block in the vertical adjusting actuation thereof just referred to.

The bottom of the groove 27, of the block 16, is V-shaped, in cross-section, as shown at 55 to insure a more positive fit against the threaded shaft 25 and better binding of said shaft against any tendency to rotate when the nut 31 is adjusted, the pressure of the block against the shaft 25 being augmented by the spring bearing of the front plate 19, on the shaft, along the upper edge 23 of said plate.

In order to eliminate the necessity of moving the attachment and lens when new film is threaded into the projector, the film shoe carrier 56 is independently mounted through the medium of a side flange or slide offset forwardly therefrom, movable in a guideway 58 in rear of the plate 6, and frictionally held therein, in any suitable manner, to permit shifting forwardly and rearwardly to correspondingly position the film shoe carrier 56 with reference to the film, diagrammatically shown at 59. However, this adjustable shoe feature constituting no part of the invention as claimed herein, needs no further detail description or illustration.

While the preferred embodiment of the invention is specifically illustrated and described herein, that is, one wherein the precise adjustment may be made of the lens position longitudinally by the nut 31, vertically by means of the crank or handle 52, and horizontally by means of the crank or handle 49, it is apparent that the methods of attaining the adjustments in the three co-ordinate directions are interchangeable, and that variations may be made to provide for adapting the attachment to various types of projecting machines; also that whereas the three co-ordinate directions of longitudinal or focusing of the lens, and vertical and horizontal positioning movements, appear in this preferred embodiment of the lens supporting device, the invention, without changing the spirit thereof, can obviously be embodied in devices where the axes of the adjustments vertically and horizontally are other than those mentioned, in other words, not mutually perpendicular.

We claim:

1. An adjustable projection apparatus comprising a fixed supporting member provided with a slotted portion, a lens carrier movable in a plane with respect to said support, and manually rotatable eccentric camming means operatively associated with the lens carrier and slotted portion in the fixed supporting member adapted to drive said lens carrier linearly, the eccentric camming means comprising a rotatable shaft passing through the lens carrier along which said carrier may slide, said shaft having an eccentric cam at one end engaging the slot in the fixed supporting member so that rotation of the shaft and eccentric camming means will effect shifting of the lens carrier.

2. An adjustable projection apparatus comprising a fixed supporting member provided with a slotted portion, a lens carrier movable in a plane with respect to said support, and manually rotatable eccentric camming means operatively associated with the lens carrier and slotted portion in the fixed supporting member adapted to drive said lens carrier linearly, the eccentric camming means comprising a rotatable shaft passing through the lens carrier along which said carrier may slide, said shaft having an eccentric cam at one end engaging the slot in the fixed supporting member so that rotation of the shaft and eccentric camming means will effect shifting of the lens carrier in a given plane, in combination with means for moving said lens carrier along said manually rotatable shaft and in a plane angularly disposed to said first-mentioned plane.

GIFFORD M. MAST.
ELMER R. SHARP.

REFERENCES CITED

The following references are of record in the file of this patent:

UNITED STATES PATENTS

| Number | Name | Date |
|---|---|---|
| 929,776 | Mills | Aug. 3, 1909 |
| 1,204,425 | Gall | Nov. 14, 1916 |
| 1,780,945 | Sapier | Nov. 11, 1930 |
| 1,847,856 | Adams | Mar. 1, 1932 |
| 1,861,496 | Guggenheim | June 7, 1932 |
| 1,884,731 | Kindelmann | Oct. 25, 1932 |
| 1,907,753 | Dina | May 9, 1933 |
| 2,029,938 | Newman | Feb. 4, 1936 |
| 2,173,237 | Runge | Sept. 19, 1939 |
| 2,339,503 | Miller | Jan. 18, 1944 |